United States Patent
Kwon et al.

(10) Patent No.: US 9,232,456 B2
(45) Date of Patent: Jan. 5, 2016

(54) SYSTEMS AND METHODS FOR PACKET TRANSMISSION WITH COMPRESSED ADDRESS

(71) Applicant: FutureWei Technologies, Inc., Plano, TX (US)

(72) Inventors: Younghoon Kwon, San Diego, CA (US); Yunsong Yang, San Diego, CA (US); Zhigang Rong, San Diego, CA (US); Zhiming Ding, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 140 days.

(21) Appl. No.: 13/917,446

(22) Filed: Jun. 13, 2013

(65) Prior Publication Data

US 2014/0003343 A1 Jan. 2, 2014

Related U.S. Application Data

(60) Provisional application No. 61/666,522, filed on Jun. 29, 2012.

(51) Int. Cl.
*H04J 3/06* (2006.01)
*H04W 40/02* (2009.01)
(Continued)

(52) U.S. Cl.
CPC ........... *H04W 40/02* (2013.01); *H04L 61/6072* (2013.01); *H04W 8/26* (2013.01);
(Continued)

(58) Field of Classification Search
CPC ..... H04L 12/66; H04L 1/0025; H04L 1/1816; H04L 2209/08; H04L 25/03866; H04L 9/0643; H04W 4/02; H04W 52/50; H04W 72/02; H04W 74/004; H04W 74/0833

USPC .......... 370/252, 312, 329, 432, 509
See application file for complete search history.

(56) References Cited

U.S. PATENT DOCUMENTS

| | | | |
|---|---|---|---|
| 6,751,230 B1 * | 6/2004 | Vogel et al. | 370/432 |
| 2003/0072445 A1 * | 4/2003 | Kuhlman et al. | 380/42 |

(Continued)

FOREIGN PATENT DOCUMENTS

| | | |
|---|---|---|
| CN | 1859240 A | 11/2006 |
| CN | 101141493 A | 3/2008 |

OTHER PUBLICATIONS

International Search Report and Written Opinion of the International Searching Authority received in Patent Cooperation Treaty Application No. PCT/CN2013/078017, mailed Oct. 10, 2013, 9 pages.

(Continued)

*Primary Examiner* — Dang Ton
*Assistant Examiner* — Sai Aung
(74) *Attorney, Agent, or Firm* — Futurewei Technologies, Inc.

(57) ABSTRACT

System and method embodiments are provided for transmitting a packet to a wireless device using a partial identifier. The embodiments enable communication using partial addresses with reduced risk of collision between two devices that share the same partial identifier. In an embodiment, a method includes determining at the first wireless station a scrambled identifier for a second wireless station according to a synchronized time and a partial identifier corresponding to one of the first wireless station and the second wireless station, wherein the synchronized time is synchronized with a time in the second wireless station, and wherein the partial identifier comprises a portion of a device identifier for at least one of the first wireless station and the second wireless station, and transmitting a packet to the second wireless station, wherein the packet comprises a payload and a header, and wherein the header comprises the scrambled identifier.

32 Claims, 8 Drawing Sheets

(51) Int. Cl.
  *H04W 8/26* (2009.01)
  *H04L 29/06* (2006.01)
  *H04W 12/10* (2009.01)
  *H04W 84/12* (2009.01)
  *H04L 29/12* (2006.01)

(52) U.S. Cl.
  CPC ........ *H04L 61/2046* (2013.01); *H04L 61/6004* (2013.01); *H04L 63/123* (2013.01); *H04L 63/162* (2013.01); *H04W 12/10* (2013.01); *H04W 84/12* (2013.01); *Y02B 60/50* (2013.01)

(56) References Cited

U.S. PATENT DOCUMENTS

| | | | |
|---|---|---|---|
| 2007/0074242 A1* | 3/2007 | Wang et al. | 725/31 |
| 2007/0118748 A1 | 5/2007 | Edney | |
| 2008/0165697 A1* | 7/2008 | Zeira et al. | 370/252 |
| 2009/0141887 A1* | 6/2009 | Yap et al. | 380/28 |
| 2009/0190613 A1* | 7/2009 | Finn | 370/509 |
| 2011/0044223 A1* | 2/2011 | Kim et al. | 370/312 |
| 2012/0082313 A1* | 4/2012 | Diamant et al. | 380/270 |
| 2012/0176995 A1* | 7/2012 | Parkvall et al. | 370/329 |

OTHER PUBLICATIONS

Cheong, M, "TGah Functional Requirements and Evaluation Methodology Rev. 5," IEEE P802.11 Wireless LANs, doc.: IEEE 802.11-09/00000905r5, Jan. 19, 2012, 20 pages.

"IEEE 802.11ac/™ D2.0 Draft Standard for Information Technology—Telecommunications and Information Exchange Between Systems—Local and Metropolitan Area Networks—Specific Requirements Part 11: Wireless LAN Medium Access Control (MAC) and Physical Layer (PHY) Specifications," Jan. 2012, 369 pages.

* cited by examiner

| CONDITION | GROUP_ID | PARTIAL_AID |
|---|---|---|
| ADDRESSED TO AP | 0 | BSSID[39:47] |
| ADDRESSED TO MESH STA | 0 | RA[39:47] |
| SENT BY AN AP AND ADDRESSED TO A STA ASSOCIATED WITH THAT AP OR SENT BY A DLS OR TDLS STA IN A DIRECT PATH TO A DLS OR TDLS STA | 63 | $(dec(AID[0:8]) + dec(BSSID[44:47] \oplus BSSID[40:43]) (9-1) \times 2^5) \bmod 2^9$<br>WHERE<br>$\oplus$ IS A BITWISE EXCLUSIVE OR OPERATION<br>$mod$ X INDICATES THE X-MODULO OPERATION<br>$dec(A[b:c])$ IS THE CAST TO DECIMAL OPERATOR WHERE $b$ IS SCALED BY $2^0$ AND $c$ BY $2^{c-b}$ |
| OTHERWISE | 63 | 0 |

SYSTEMS AND METHODS FOR PACKET TRANSMISSION WITH COMPRESSED ADDRESS

CROSS-REFERENCE TO RELATED APPLICATIONS

The present application claims the benefit of U.S. Provisional Patent Application No. 61/666,522 filed Jun. 29, 2012 and entitled "System and Method of Packet Transmission with Compressed Address," which is incorporated herein by reference as if reproduced in its entirety.

TECHNICAL FIELD

The present invention relates to a system and method for wireless communications, and, in particular embodiments, to a system and method for packet transmission with compressed address.

BACKGROUND

Currently, Institute of Electrical and Electronics Engineers (IEEE) 802.11ah defines the wireless local area network protocol, especially for sub-1 Gigaherz (GHz) carrier frequency. Its main requirements include a longer coverage area (up to 1 kilometer (km)), a physical layer (PHY) data rate of at least 100 kilobits per second (kbps), a maximum aggregate multi-station data rate of 20 megabits per second (Mbps), use orthogonal frequency-division multiplexing (OFDM) PHY modulation, and support the number of associations beyond 2007 for outdoor applications. However, overhead is a critical issue for 802.11ah. The physical layer of 802.11ah uses a 10 times slower clock than the normal 802.11 protocol, and therefore each symbol length is 10 times longer than the normal 802.11 protocol. Efficiency of the protocol is important for 802.11ah.

An addressing method in current IEEE 802.11 protocol uses a 6 byte Media Access Control (MAC) address for both access point (AP) and station (STA). However, for each STA, practically less than 100 APs will be seen, and thus the use of a 6 Byte MAC address to indicate those APs causes too much of waste. Similarly, for each AP, practically at most several thousand STAs can be associated, and the use of a 6 byte MAC address to indicate those STAs also implicates too much of waste.

Figure 1:
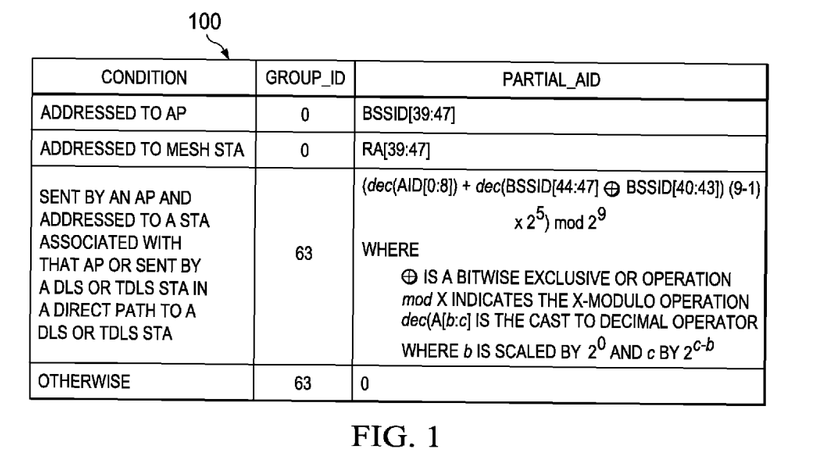
FIG. 1 illustrates partial information on AID.

To resolve this addressing issue, the use of a partial identifier (ID) has been considered. In IEEE 802.11 TGac, instead of using a whole association ID (AID), the use of only partial information on AID, as shown in table 100 in FIG. 1, has been proposed and accepted. However, because only part of the information is used, one partial AID can indicate multiple STAs simultaneously.

Figure 2:
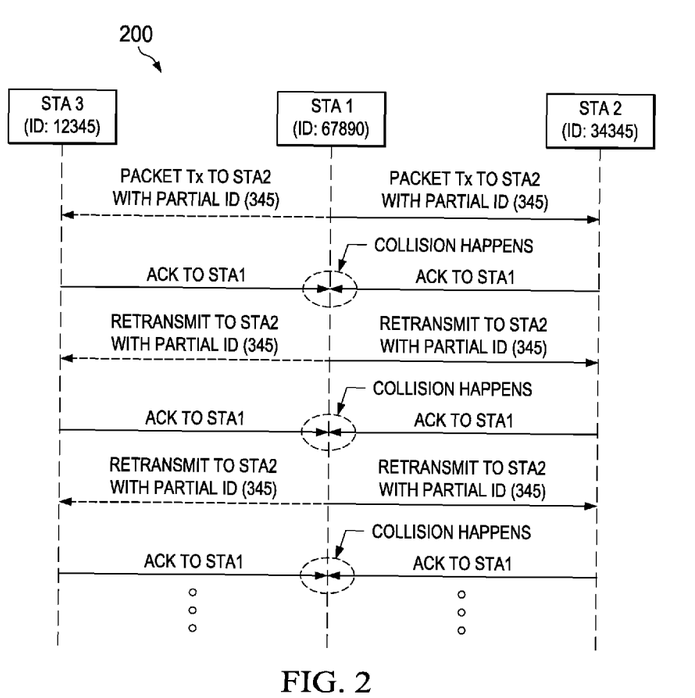
FIG. 2 illustrates an example scenario for the partial information on AID.

An example scenario of a method 200 for sending packets with a partial ID illustrates problems with the conventional solution, as shown in FIG. 2. A STA (STA1) sends a packet with a receiver address using a partial ID. Two different receivers (STA2 and STA3) have the same partial ID that STA1 used as a receiver address, and these two STAs will respond with an acknowledgment (ACK) packet at the same time, which will result in a packet collision. As STA1 did not receive the ACK packet correctly, it will retransmit the same packet again with the same partial ID. Because the same partial ID is used, STA2 and STA3 will respond again, which will result in another packet collision. Therefore, when a collision happens due to the partial ID, it is possible that collision can happen for multiple consecutive packets or retransmissions.

SUMMARY OF THE INVENTION

In accordance with an embodiment, a method in a first wireless station for transmitting a packet includes determining at the first wireless station a scrambled identifier for a second wireless station according to a synchronized time and a partial identifier corresponding to one of the first wireless station and the second wireless station, wherein the synchronized time is synchronized with a time in the second wireless station, and wherein the partial identifier comprises a portion of a device identifier for at least one of the first wireless station and the second wireless station, and transmitting a packet to the second wireless station, wherein the packet comprises a payload and a header, and wherein the header comprises the scrambled identifier.

In accordance with another embodiment, a network component configured for communicating in a wireless local area network using a partial identifier includes a processor and a computer readable storage medium storing programming for execution by the processor, the programming including instructions to: determine a scrambled identifier for a wireless station according to a synchronized time and a partial identifier corresponding to one of the wireless station and the wireless communication device, wherein the synchronized time is synchronized with a time in the wireless station, and wherein the partial identifier comprises a portion of a device identifier for at least one of the wireless station and the wireless communication device, and transmit a packet to the wireless station, wherein the packet comprises a payload and a header, and wherein the header comprises the scrambled identifier.

In accordance with another embodiment, a method in a wireless communication device for communicating in a wireless local area network includes receiving a packet from a wireless station, wherein the packet comprises a header and a payload, and wherein the header comprises a scrambled partial identifier determined according to a synchronized time and a first partial identifier, descrambling the scrambled partial identifier to obtain the first partial identifier, sending an acknowledgment to the wireless station when the first partial identifier matches a second partial identifier corresponding to one of the wireless communication device and the wireless station, wherein the second partial identifier is obtained from a portion of a full device identifier corresponding to one of the wireless communication device and the wireless station, and discarding the packet when the first partial identifier is different from the second partial identifier.

In accordance with another embodiment, a network component configured for communicating in a wireless local area network using a partial identifier includes a processor and a computer readable storage medium storing programming for execution by the processor, the programming including instructions to: receive a packet from a wireless station, wherein the packet comprises a header and a payload, and wherein the header comprises a scrambled partial identifier determined according to a synchronized time and a first partial identifier, descramble the scrambled partial identifier to obtain the first partial identifier, send an acknowledgment to the wireless station when the first partial identifier matches a second partial identifier corresponding to one of the wireless communication device and the wireless station, wherein the second partial identifier is obtained from a portion of a full device identifier corresponding to one of the wireless communication device and the wireless station, and discard the packet when the first partial identifier is different from the second partial identifier.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

An embodiment system and method for packet transmission provides a compressed address, where the receiver address is scrambled with a timestamp value. An embodiment allows the use of a shorter receiver address field, which can improve channel efficiency. An embodiment reduces probability of consecutive collision. An embodiment improves the randomness of the receiver address and thus avoids bursty partial ID collision probability. An embodiment provides efficient uplink/downlink packet transmission with less overhead, less power consumption, and avoidance of the hidden node problem. Embodiments may be applied to devices with WLAN (Wireless Local Area Network) capabilities, such as sensors, smart phones, tablets, and the like.

An embodiment reduces addressing overhead by using partial ID information from either the transmitter or the receiver (e.g., from the device ID). The device ID can be, for example, a Basic Service Set Identifier (BSID) or an AID. To reduce the possibility of consecutive partial ID collision, partial ID information is scrambled with at least part of a timestamp value of the receiver to produce a scrambled partial ID. To do this, both transmitter and receiver share the timestamp value, or the receiver lets the transmitter know its current timestamp value. The timestamp value constantly increases and it is typically different from other stations that are not synchronized with this station. In an embodiment, the partial ID of the transmitter is used to create a scrambled ID where the receiver knows the partial ID of the transmitter. This may be utilized when the transmitter is an access point (AP) and the packet is intended for one or more stations, where some of the stations are associated with the AP and other stations are associated with other APs. Those stations associated with other APs will not recognize the deciphered partial ID, and consequently will discard the packet, while the other stations associated with the AP will recognize the APs partial ID and send an acknowledgement back to the AP. In other embodiments, the partial ID of the receiver is used to create the scrambled partial ID.

In some embodiments, a combination of both the partial ID from the receiver and the partial ID of the transmitter may be utilized to create the scrambled partial ID.

Figure 3:
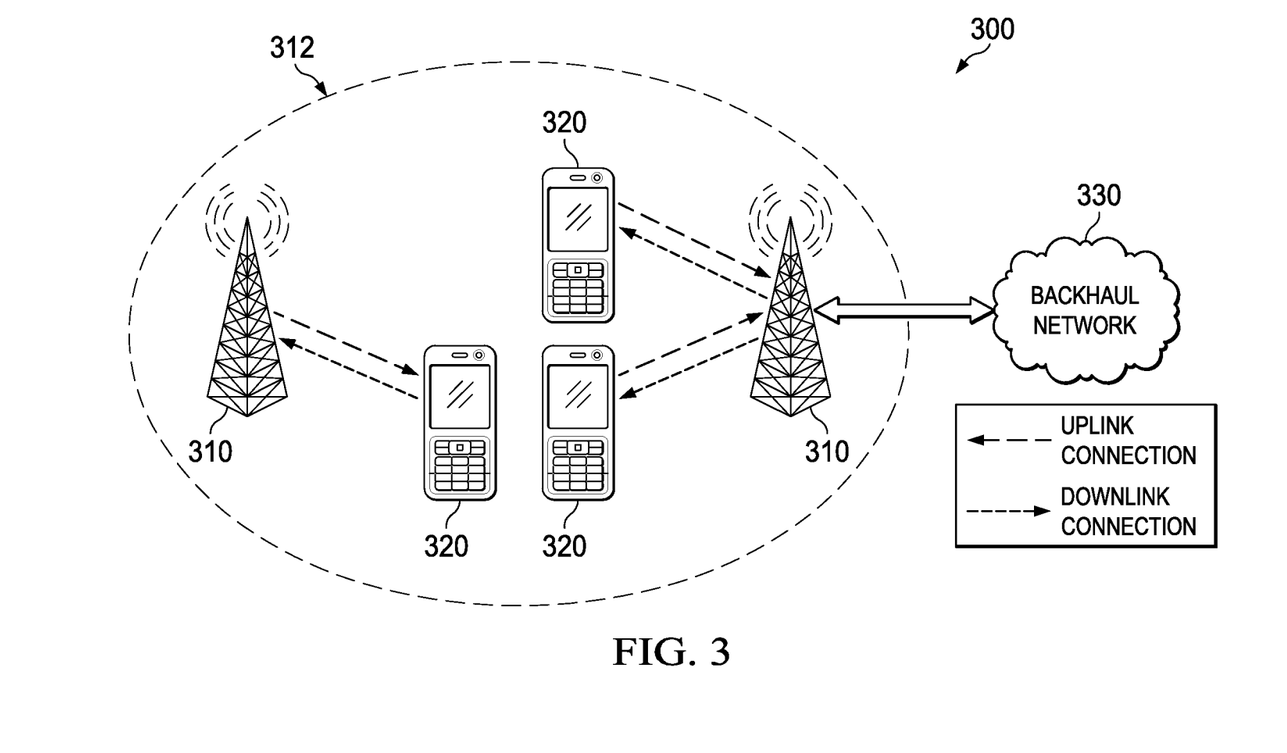
FIG. 3 illustrates a network for communicating data.

FIG. 3 illustrates a network 300 for communicating data. The network 300 comprise multiple access points (APs) 310 which may have an overlapping coverage area 312, a plurality of user equipment (UEs) 320, and a backhaul network 330. As used herein, the term AP may also be referred to as a transmission point (TP) and the two terms may be used interchangeably throughout this disclosure. The AP 310 may comprise any component capable of providing wireless access by, inter alia, establishing uplink (dashed line) and/or downlink (dotted line) connections with the UEs 320, such as a base transceiver station (BTS), an enhanced base station (eNB), a femtocell, and other wirelessly enabled devices. The UEs 320 may comprise any component capable of establishing a wireless connection with one or more of the APs 310. As shown, some of the UEs 320 may be associated with one of the APs 310 while other UEs 320 may be associated with the other one of the APs 310. The APs 310 and UEs 320 may also be referred to as stations, wireless stations, and wireless communication devices. The APs 310 may also be referred to as a central station—the central connection among a collection of wireless devices. The backhaul network 330 may be any component or collection of components that allow data to be exchanged between the AP 310 and a remote end (not shown). In some embodiments, the network 300 may comprise various other wireless devices, such as relays, femtocells, etc.

In an embodiment, the APs 310 and the UEs 320 may utilize partial identifiers or compressed addresses when communicating with each other. In order to avoid collisions in cases in which two or more devices (e.g., APs 310, UEs 320) have the same partial identifier or compressed address, the APs 310 and UEs 320 employ a scrambled partial identification or scrambled partial identifier created using the partial identifier of either the transmitting or the receiving device and a shared synchronized time or time stamp or time stamp information. The recipient device may descramble the scrambled partial identifier using the shared synchronized time or time stamp to recover the partial identifier. If the recipient is not synchronized to the transmitter, then the recovered partial identifier will likely not match the recipient's partial identifier (or the transmitter's partial identifier in cases in which the transmitter's partial identifier is used) and the recipient will discard the packet.

At first, the clocks in both the transmitter (e.g., AP 310, UE 320) and the receiver (e.g., AP 310, UE 320) are synchronized. Multiple methods are available for synchronization. One way is that the central station periodically sends timestamp information, and each mobile station within the coverage of the central station synchronizes its clock to the received timestamp value. Also, all stations have their own unique ID.

When a station (STA1) (e.g., AP 310, UE 320) transmits a packet to another station (STA2) (e.g., AP 310, UE 320), STA1 includes only part of STA2's ID scrambled with at least partial timestamp information at the time of transmission as a receiver address in the packet header. Multiple embodiments are available for scrambling methods for the partial ID with at least timestamp information. As the length of the timestamp is normally not the same with the length of address field, multiple embodiments are available for selecting partial timestamp information out of a full timestamp. Multiple embodiments are available for determining timestamp information at the time of transmission.

When STA2 receives the transmitted packet, it checks the receiver address field in the packet header by descrambling the information with the timestamp information at the time of transmission. If the descrambled address field matches with the predefined part of its own ID, STA2 considers itself as a destination of the packet, and sends an acknowledgement ACK packet to the transmitter.

For retransmission, in case a transmitter (e.g., STA1) doesn't receive an ACK packet from the receiver (e.g., STA2) correctly, STA1 can retransmit the same data payload again. STA1 follows the same packet transmission procedure as with the initial transmission, however in this case, new timestamp information corresponding to the time of retransmission is used. Also, when STA2 receives the retransmission packet, it follows the same procedure with the new timestamp information corresponding to the time of retransmission.

A first scrambling method provides a bit by bit exclusive-OR operation of the partial timestamp and partial ID. An outcome of the exclusive-OR operation is the scrambled partial ID. The partial timestamp and partial ID have the same length. A K bit scrambled sequence X(k) can be obtained as $X(k)=S(k)\oplus I(k)$, $0 \leq k \leq K-1$, where S(k) and I(k) denote sequence of partial timestamp and partial ID, respectively.

Figure 4:
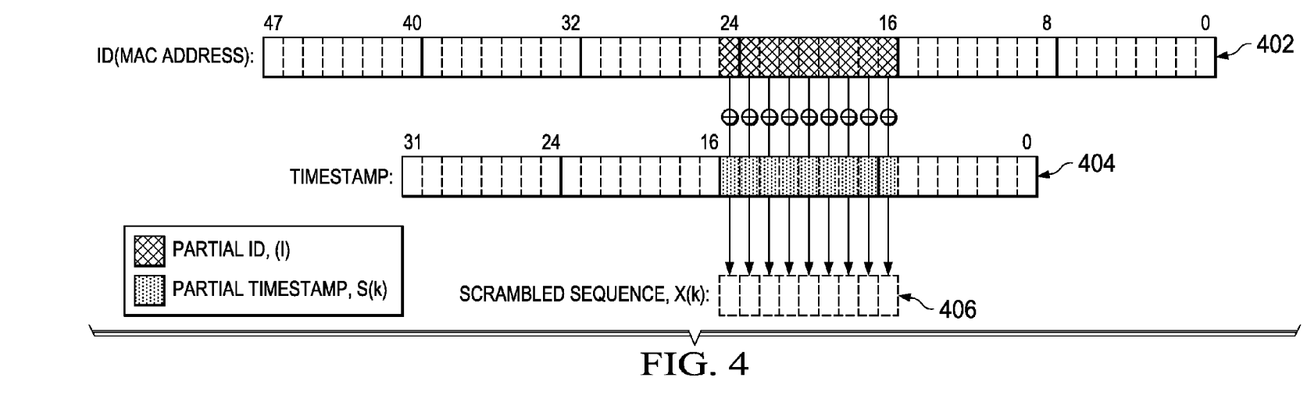
FIG. 4 illustrates an example embodiment for a 9 bit scrambled sequence.

FIG. 4 shows an embodiment implementation example for a 9 bit scrambled sequence. The ID 402 may comprise about 48 bits. The $16^{th}$ through the $24^{th}$ bits of the ID 402 may be selected by prearrangement as the partial identification or compressed address. The time stamp 404 may comprise 32 bits and the $7^{th}$ through the $15^{th}$ bits may be selected by prearrangement by two stations as the bits from the timestamp to use to produce a scrambled partial ID 406. In an embodiment, the length of the portion of the time stamp and the length of the partial ID should be equal. In other embodiments with different methods of scrambling the partial ID with the timestamp, the length of the timestamp may be different from the length of the partial ID.

A second scrambling method uses K bits from a predefined hash function. The ID sequence is scrambled with a given timestamp using a predefined hash function. K least significant bits (LSBs) are selected from the scrambled sequence. In an embodiment, the predefined hash function is the well-defined MD5 (Message-Digest algorithm 5).

Figure 5:
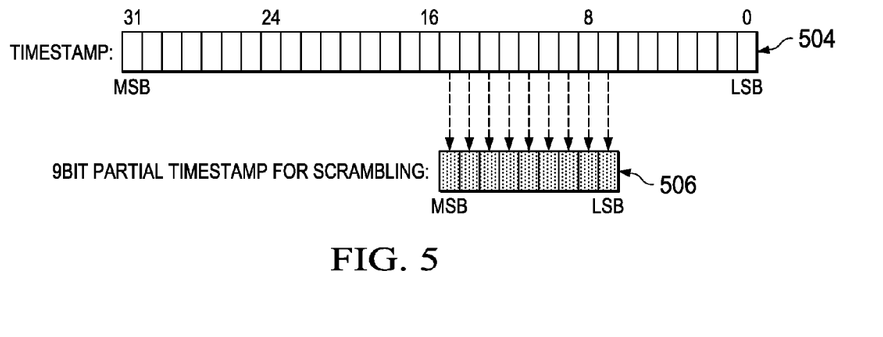
FIG. 5 illustrates an embodiment of a partial timestamp selection.

In a first partial timestamp information selection method, a predefined part from the original timestamp is used. No additional indication is needed. As an application to IEEE 802.11 timestamp, in 802.11 protocol, especially in case of TGah, each short beacon may include a 4 byte timestamp with the unit of 1 usec. As the short beacon transmission interval is expected to be on the order of 100 msec, and, assuming the length of the address field is 9 bits, the use of the partial time stamp 506 from a timestamp 504, shown in FIG. 5, will provide good scrambling performance.

A second partial timestamp information selection method uses a central station's indication. Different central stations may have different (short) beacon intervals, and thus, two consecutive timestamp data delivered in two consecutive (short) beacons may have different bit change patterns. For example, if the timestamp unit is a microsecond and the beacon interval is 100 msec, the timestamp will increase in the step of 10^5=0x186A0 for each beacon interval. Therefore, there is no change in 5 LSB values in the timestamp. However, if the beacon interval is 1 sec, the timestamp increase step becomes 0x4240, and in this case there is no change in 6 LSB values in the timestamp. Therefore, depending on the central station's (short) beacon interval, different parts of the timestamp may be used for the partial timestamp.

Also by doing so, the possibility increase of different adjacent central stations using different parts of the timestamp value, it increases the randomness of consecutive partial timestamp values among adjacent central stations. Therefore, in this method, the central station (or original source of the timestamp) decides which part of the original timestamp to be used and indicates to its associated stations. This information can be indicated when each station associates to the central station, and can then be broadcasted periodically or when this value changes.

In a first timestamp information decision method, the same timestamp value is broadcasted by central station. The central station broadcasts timestamp information at each periodic management packet, such as the (short) beacon in IEEE 802.11 TGah. Then, within the (short) beacon interval, a station transmitting a packet uses the same timestamp value as indicated in the (short) beacon in extracting partial timestamp information. As this timestamp is directly broadcasted by the central station, both transmitter and receiver can easily identify used partial timestamp in the packet header and receiver can easily descramble the ID information. However, in this case, every packet transmission within the (short) beacon interval uses the same timestamp value, it is recommended to send retransmission packet at least in different (short) beacon interval in case collision happens, to reduce consecutive collision probability.

In an embodiment, the timestamp or synchronized time should be the same length as the length of the partial ID. The central station or one of the wireless stations may specify that the portion of the timestamp to use is offset from LSB by M bits and that N consecutive bits should be used, where M and N are predefined and N is equal to the length of the partial ID.

In a second timestamp information decision method, a current timestamp value is used by modifying the broadcasted timestamp. The central station broadcasts timestamp information at each periodic management packet, such as the (short) beacon in IEEE 802.11 TGah. Then, each station listening to the (short) beacon synchronizes and updates its timestamp value. A station transmitting a packet uses the timestamp value at the time of transmission by adding the time difference between the (short) beacon transmission and the current time on the timestamp value indicated in the (short) beacon. The station receiving the packet also modifies the timestamp value indicated in the (short) beacon by adding the time difference between the (short) beacon transmission and the packet transmission time. To avoid a possible synchronization error between the transmitting and receiving stations, the difference between the (short) beacon transmission and packet transmission provides sufficient margin such that both transmitter and receiver can have the same number even though there is synchronization error. For example, the last N LSBs of the difference are set to 0. By doing this, even though retransmission happens in the same (short) beacon interval, the retransmission packet can still maintain low collision probability.

Figure 6:
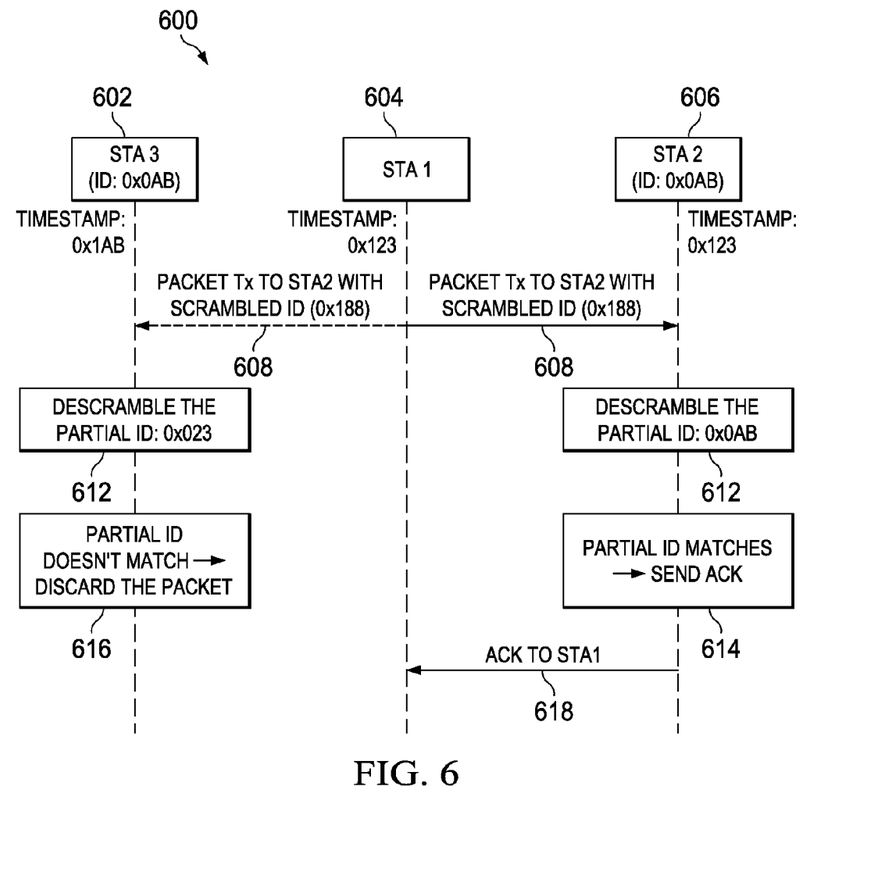
FIG. 6 illustrates an embodiment method for transmitting packets using a partial ID.

FIG. 6 illustrates an embodiment method 600 for transmitting packets using a partial ID. STA2 606 has a MAC address of 0x1234567890AB, and STA3 602 has a MAC address of 0xBA09876542AB. The last 9 LSBs of the MAC address is used as the partial ID as follows: STA2: 0x0AB, and STA3: 0x0AB.

STA1 604 and STA2 606 belong to AP1 (not shown) whose 9 bit partial timestamp is 0x123, and STA3 602 belongs to AP2 (not shown) whose 9 bit partial timestamp is 0x1AB. Assuming a bit-by-bit XOR scheme is used for the scrambling method, then when STA1 604 sends a packet to STA2 606, the receiver address (RA) is RA @ STA1=0x0AB⊕0x123=0x188. STA1 604 transmits 608 a packet to STA2 606 with scrambled ID 0x188.

When STA2 606 receives the packet, it checks the partial ID by descrambling 612 with AP1's partial timestamp value, which is 0x123: Partial ID @ STA2=0x188⊕0x123=0x0AB. As the received partial ID matches 614 with STA2's, STA2 606 identifies this packet transmitted to itself, and send 618 an ACK packet to STA1.

When STA3 602 receives the packet, it checks the partial ID by descrambling 612 with AP2's partial timestamp value, which is 0x1AB: Partial ID @ STA3=0x188⊕0x1AB=0x023. As the received partial ID does not match with STA3's, STA3 602 discards 616 this packet. In this case, even though STA3 602 has the same partial ID, collision can be avoided.

Figure 7:
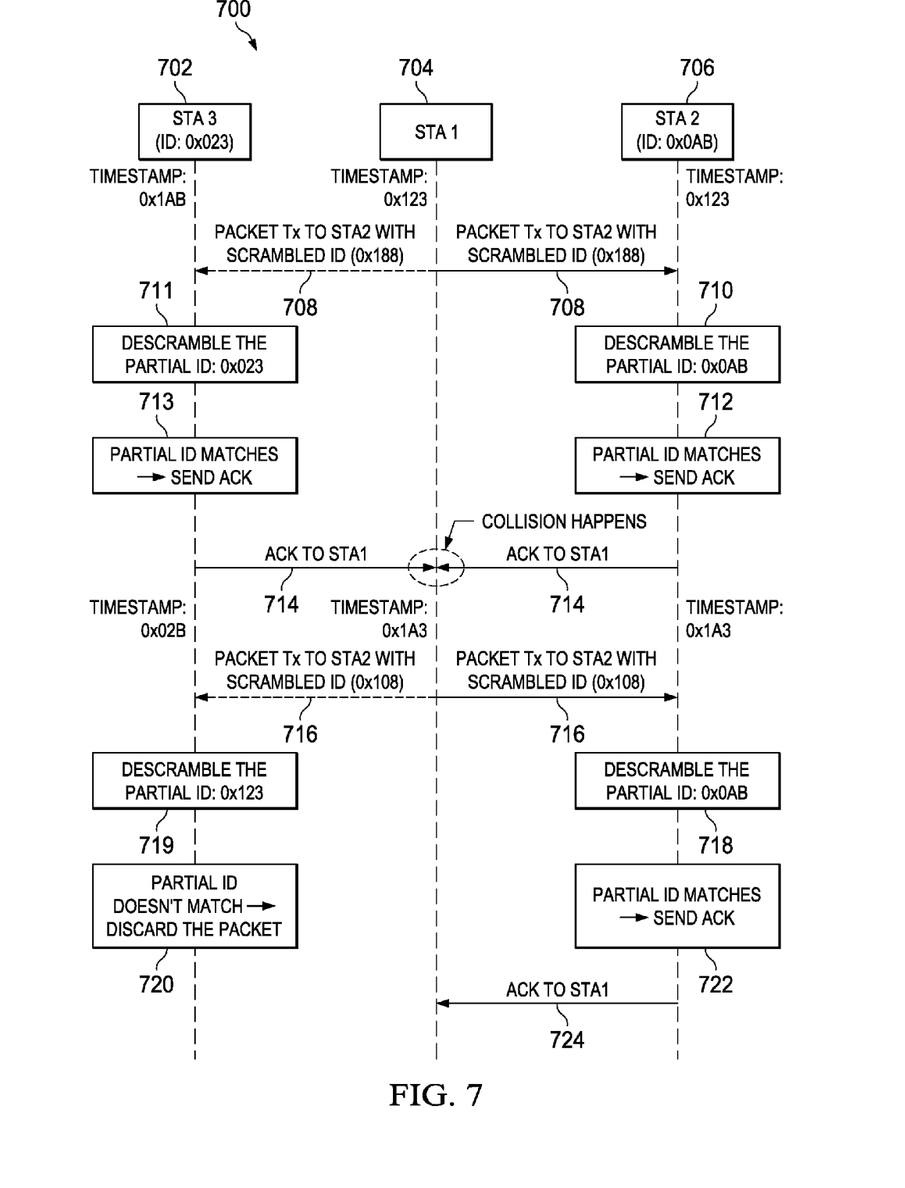
FIG. 7 illustrates another embodiment method for transmitting packets using a partial ID.

FIG. 7 illustrates a second operation example. In a first embodiment of this example, STA2 706 has a MAC address of 0x1234567890AB, and STA3 702 has a MAC address of 0xBA0987654223. The last 9 LSBs of the MAC address are used as a partial ID: STA2: 0x0AB, and STA3: 0x023.

STA1 704 and STA2 706 belong to AP1 (not shown) whose 9 bit partial timestamp is 0x123, and STA3 702 belongs to AP2 (not shown) whose 9 bit partial timestamp is 0x1AB. Assuming a bit-by-bit XOR scheme is used for the scrambling method, then when STA1 704 sends 708 a packet to STA2 706, the receiver address (RA) is RA @ STA1=0x0AB⊕0x123=0x188.

When STA2 706 receives the packet, it checks the partial ID by descrambling 710 with AP1's partial timestamp value, which is 0x123: Partial ID @ STA2=0x188⊕0x123=0x0AB. As the received partial ID matches 712 with STA2's, STA2 706 identifies this packet transmitted to itself, and sends 714 an ACK packet to STA1 704.

When STA3 702 receives the packet, it checks the partial ID by descrambling 711 with AP2's partial timestamp value, which is 0x1AB: Partial ID @ STA3=0x188⊕0x1AB=0x023. As the received partial ID matches 713 with STA3's, STA3 702 identifies this packet transmitted to itself, and sends 714 an ACK packet to STA1 704. In this case, as both STA2 706 and STA3 702 send an ACK packet at the same time, collision happens.

In a second embodiment of the second operation example, as STA1 704 did not receive a correct ACK packet, it tries retransmission at a next time interval. In this case, the timestamps for both AP1 and AP2 increase with same amount. Assume the new timestamp value as AP1: 0x123+0x080=0x1A3, and AP2: 0x1AB+0x080=0x02B (9 LSB is considered only). Then when STA1 704 resends the packet to STA2 706, the receiver address (RA) is RA @ STA1=0x0AB⊕0x1A3=0x108.

When STA2 706 receives the packet, it checks the partial ID by descrambling 718 with AP1's partial timestamp value, which is 0x1A3: Partial ID @ STA2=0x108⊕0x1A3=0x0AB. As the received partial ID matches 722 with STA2's, STA2 706 identifies this packet transmitted to itself, and sends 724 an ACK packet to STA1 704.

When STA3 receives the packet, it checks the partial ID by descrambling 719 with AP2's partial timestamp value, which is 0x02B: Partial ID @ STA3=0x108⊕0x02B=0x123. As the received partial ID does not match with STA3's, STA3 discards 720 this packet. In this case, even though collision happened at the initial transmission, the collision is avoided at the time of retransmission.

Figure 8:
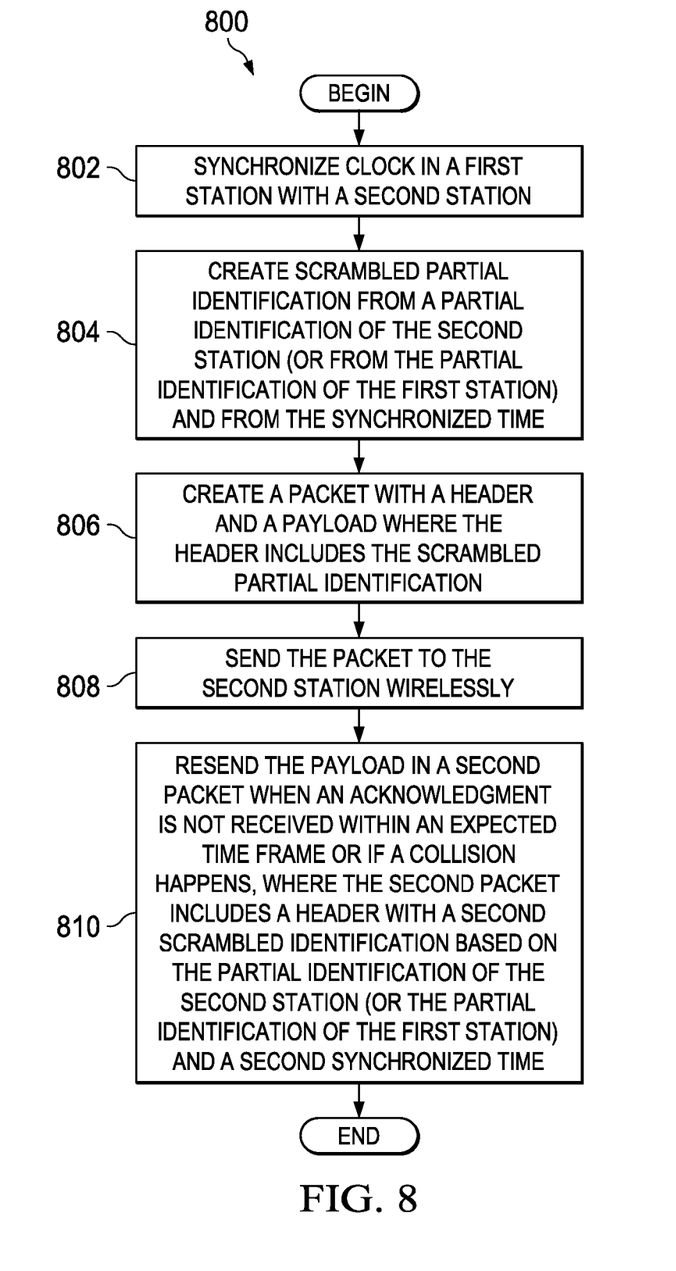
FIG. 8 is a flowchart of an embodiment method for transmitting packets using a partial identification (i.e., compressed address)

FIG. 8 is a flowchart of an embodiment method 800 for transmitting packets using a partial identification (i.e., compressed address). The method 800 begins at block 802 where a first station synchronizes its clock with a second station. At block 804, the first station creates a scrambled partial identification from a partial identification of either the first or second station and from the synchronized time. The first station may use its own partial identification if, for example, the first station is the AP and is broadcasting to multiple stations. Using the APs partial ID allows stations that are associated with the AP to determine that the broadcast is intended for them, whereas stations that are associated with a different AP will recognize that the broadcast is not intended for them and will, consequently, discard the packet. At block 806, the first station creates a packet with a header and a payload, where the header includes the scrambled partial identification. At block 808, the first station sends the packet to the second station wirelessly. At block 810, the first station may resend the payload in a second packet if the first station does not receive an acknowledgement within an expected time frame (or time window) or if the first station receives acknowledgments from more receivers than is expected (i.e., a collision), after which the method 800 ends. The second packet includes the original payload and a new header with a second scrambled identification based on the original partial identification and a new second synchronized time.

Figure 9:
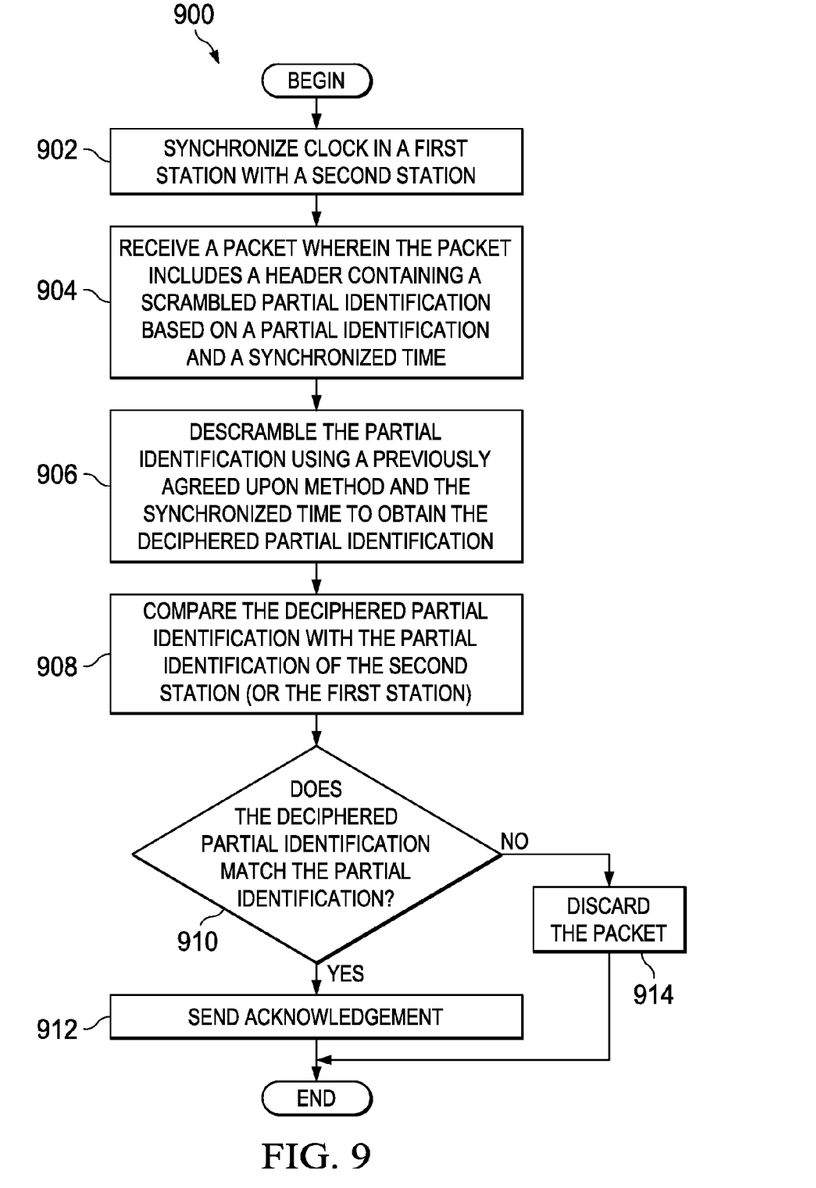
FIG. 9 is a flowchart of an embodiment method for receiving packets using a partial identification (i.e., compressed address)

FIG. 9 is a flowchart of an embodiment method 900 for receiving packets using a partial identification (i.e., compressed address). The method 900 begins at block 902 where the first and second stations synchronize their clocks. At block 904, the second station receives a packet, wherein the packet includes a header and a payload and the header contains a scrambled partial identification. At block 906, the second station descrambles the partial identification using a previously agreed upon method using the synchronized timestamp (or other synchronized time) to obtain a deciphered partial identification. At block 908, the second station compares the deciphered partial identification with the partial identification of the second station (or alternatively, with the first station depending on implementation). At block 910, the second station determines whether the deciphered partial identification matches the partial identification and, if yes, the method 900 proceeds to block 912 where the second station sends an acknowledgement to the first station, after which, the method 900 ends. If, at block 910, the second station determines that the deciphered partial identification does not match the partial identification, then the method 900 proceeds to block 914 where the second station discards the packet, after which, the method 900 ends.

Figure 10:
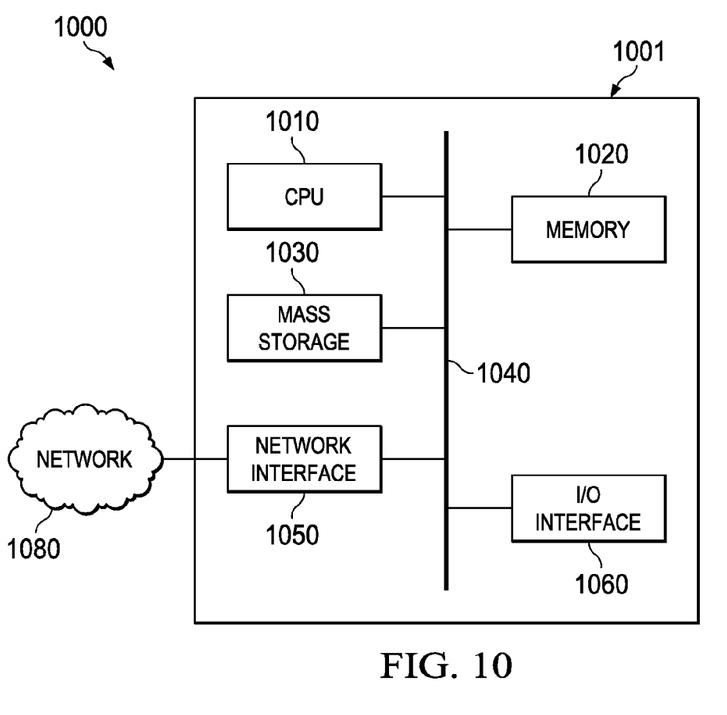
FIG. 10 is a processing system that can be used to implement various embodiments.

FIG. 10 is a block diagram of a processing system 1000 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 1000 may comprise a processing unit 1001 equipped with one or more input/output devices, such as a speaker, microphone, mouse, touchscreen, keypad, keyboard, printer, display, and the like.

The processing unit 1001 may include a central processing unit (CPU) 1010, memory 1020, a mass storage device 1030, a network interface 1050, and an I/O interface 1060 connected to a bus 1040.

The bus 1040 may be one or more of any type of several bus architectures including a memory bus or memory controller, a peripheral bus, video bus, or the like. The CPU 1010 may comprise any type of electronic data processor. The memory 1020 may comprise any type of system memory such as static random access memory (SRAM), dynamic random access memory (DRAM), synchronous DRAM (SDRAM), read-only memory (ROM), a combination thereof, or the like. In an embodiment, the memory 1020 may include ROM for use at boot-up, and DRAM for program and data storage for use while executing programs.

The mass storage device 1030 may comprise any type of storage device configured to store data, programs, and other information and to make the data, programs, and other information accessible via the bus 1040. The mass storage device 1030 may comprise, for example, one or more of a solid state drive, hard disk drive, a magnetic disk drive, an optical disk drive, or the like.

The I/O interface 1060 may provide interfaces to couple external input and output devices to the processing unit 1001. The I/O interface 1060 may include a video adapter. Examples of input and output devices may include a display coupled to the video adapter and a mouse/keyboard/printer coupled to the I/O interface. Other devices may be coupled to the processing unit 1001, and additional or fewer interface cards may be utilized. For example, a serial interface such as Universal Serial Bus (USB) (not shown) may be used to provide an interface for a printer.

The processing unit 1001 may also include one or more network interfaces 1050, which may comprise wired links, such as an Ethernet cable or the like, and/or wireless links to access nodes or different networks. The network interface 1001 allows the processing unit to communicate with remote units via the networks 1080. For example, the network interface 1050 may provide wireless communication via one or more transmitters/transmit antennas and one or more receivers/receive antennas. In an embodiment, the processing unit 1001 is coupled to a local-area network or a wide-area network for data processing and communications with remote devices, such as other processing units, the Internet, remote storage facilities, or the like.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method in a first wireless station for transmitting a packet, the method comprising:
    determining at the first wireless station a scrambled identifier for a second wireless station according to a synchronized time and a partial identifier corresponding to one of the first wireless station and the second wireless station, wherein the synchronized time is synchronized with a time in the second wireless station, and wherein the partial identifier comprises a portion of a device identifier for at least one of the first wireless station and the second wireless station; and
    transmitting a packet to the second wireless station, wherein the packet comprises a payload and a header, and wherein the header comprises the scrambled identifier;
    wherein determining the scrambled identifier comprises:
        generating a first sequence from the device identifier;
        generating a second sequence from the synchronized time, wherein the first sequence and the second sequence have a same length; and
        performing a bit-by-bit exclusive-OR operation between the first and the second sequences, wherein an outcome of the bit-by-bit exclusive-OR operation comprises the scrambled identifier.

2. The method of claim 1, wherein the synchronized time is determined from a time stamp that is broadcast to the first wireless station and the second wireless station from a central station.

3. The method of claim 1, wherein the first wireless station comprises a central station that periodically broadcasts time stamp information to the second wireless station.

4. The method of claim 1, wherein the second wireless station comprise a central station that periodically broadcasts time stamp information to the first wireless station.

5. The method of claim 1, further comprising retransmitting the payload in a second packet with a second scrambled identifier when an acknowledgement packet is not received from the second wireless station within a time window, wherein the second scrambled identifier is determined according to a new timestamp and the partial identifier.

6. The method of claim 1, wherein the second sequence comprises N consecutive bits with an M bit offset from a least significant bit of the synchronized time, wherein N is a length of the first sequence, where N and M are predefined values.

7. The method of claim 6, wherein M is provided by a central station prior to transmission of the packet.

8. The method of claim 1, wherein determining the scrambled identifier comprises performing a Message-Digest algorithm 5 (MD5).

9. The method of claim 1, wherein the device identifier comprises a Media Access Control (MAC) address.

10. The method of claim 1, wherein the device identifier comprises an Association Identifier (AID).

11. The method of claim 1, wherein the device identifier comprises a Basic Service Set Identifier (BSSID).

12. The method of claim 1, further comprising determining the synchronized time according to a broadcasted time stamp and a difference between the broadcasted time stamp and a current time.

13. The method of claim 1, further comprising determining the synchronized time according to a broadcasted time stamp.

14. A network component configured for communicating in a wireless local area network comprising:
    a processor; and
    a computer readable storage medium storing programming for execution by the processor, the programming including instructions to:
        determine a scrambled identifier for a wireless station according to a synchronized time and a partial identifier corresponding to one of the wireless station and the network component, wherein the synchronized time is synchronized with a time in the wireless station, and wherein the partial identifier comprises a portion of a device identifier for at least one of the wireless station and the network component; and transmit a packet to the wireless station, wherein the packet comprises a payload and a header, and wherein the header comprises the scrambled identifier;

wherein the instructions to determine the scrambled identifier comprise instructions to:

generate a first sequence from the device identifier;

generate a second sequence from the synchronized time, wherein the first sequence and the second sequence have a same length; and perform a bit-by-bit exclusive-OR operation between the first and the second sequences, wherein an outcome of the bit-by-bit exclusive-OR operation comprises the scrambled identifier.

15. The network component of claim 14, wherein the synchronized time is determined from a time stamp that is broadcast to the network component and the wireless station from a central station.

16. The network component of claim 14, wherein the network component comprises a central station that periodically broadcasts time stamp information to the wireless station.

17. The network component of claim 14, wherein the wireless station comprise a central station that periodically broadcasts time stamp information to the network component.

18. The network component of claim 14, wherein the programming further comprises instructions to retransmit the payload in a second packet with a second scrambled identifier when an acknowledgement packet is not received from the wireless station within a time window, wherein the second scrambled identifier is determined according to a new timestamp and the partial identifier.

19. The network component of claim 14, wherein the second sequence comprises N consecutive bits with an M bit offset from a least significant bit of the synchronized time, wherein N is a length of the first sequence, where N and M are predefined values.

20. The network component of claim 19, wherein M is provided by a central station prior to transmission of the packet.

21. The network component of claim 14, wherein the instructions to determine the scrambled identifier comprise instructions to perform a Message-Digest algorithm 5 (MD5).

22. The network component of claim 14, wherein the device identifier comprises a Media Access Control (MAC) address.

23. The network component of claim 14, wherein the device identifier comprises an Association Identifier (AID).

24. The network component of claim 14, wherein the device identifier comprises a Basic Service Set Identifier (BSSID).

25. The network component of claim 14, wherein the programming further comprises instructions to determine the synchronized time according to a broadcasted time stamp and a difference between the broadcasted time stamp and a current time.

26. The network component of claim 14, wherein the programming further comprises instructions to determine the synchronized time according to a broadcasted time.

27. A method in a wireless communication device for communicating in a wireless local area network, the method comprising:

receiving a packet from a wireless station, wherein the packet comprises a header and a payload, and wherein the header comprises a scrambled partial identifier determined according to a synchronized time and a first partial identifier;

descrambling the scrambled partial identifier to obtain the first partial identifier;

sending an acknowledgment to the wireless station when the first partial identifier matches a second partial identifier corresponding to one of the wireless communication device and the wireless station, wherein the second partial identifier is obtained from a portion of a full device identifier corresponding to one of the wireless communication device and the wireless station; and discarding the packet when the first partial identifier is different from the second partial identifier;

wherein the scrambled partial identifier comprises a first sequence and wherein descrambling the scrambled partial identifier comprises:

generate a second sequence from current time information according to a generating method shared with the wireless station; and execute a bit-by-bit exclusive-OR operation between the first and second sequences to determine the first partial identifier.

28. The method of claim 27, wherein one of the wireless station and the wireless communication device comprises a central station, and wherein the central station periodically broadcasts timestamp information such that the wireless station and the wireless communication device share a synchronized time.

29. The method of claim 27, further comprising receiving a timestamp from a central station with which the wireless station and the wireless communication device are associated and synchronizing a time on the wireless communication device to the timestamp.

30. A network component configured for communicating in a wireless local area network comprising:

a processor; and a computer readable storage medium storing programming for execution by the processor, the programming including instructions to:

receive a packet from a wireless station, wherein the packet comprises a header and a payload, and wherein the header comprises a scrambled partial identifier determined according to a synchronized time and a first partial identifier;

descramble the scrambled partial identifier to obtain the first partial identifier;

send an acknowledgment to the wireless station when the first partial identifier matches a second partial identifier corresponding to one of the network component and the wireless station, wherein the second partial identifier is obtained from a portion of a full device identifier corresponding to one of the network component and the wireless station; and discard the packet when the first partial identifier is different from the second partial identifier;

wherein the scrambled partial identifier comprises a first sequence and wherein the instructions to descramble the scrambled partial identifier comprise instructions to:

generate a second sequence from current time information according to a generating method shared with the wireless station; and execute a bit-by-bit exclusive-OR operation between the first and second sequences to determine the first partial identifier.

31. The network component of claim 30, wherein one of the wireless station and the network component comprises a central station, and wherein the central station periodically broadcasts timestamp information such that the wireless station and the network component share a synchronized time.

32. The network component of claim 30, further comprising receiving a timestamp from a central station with which the wireless station and the network component are associated and synchronizing a time on the network component to the timestamp.

* * * * *